US008893133B2

(12) United States Patent
Arnold et al.

(10) Patent No.: US 8,893,133 B2
(45) Date of Patent: Nov. 18, 2014

(54) DYNAMIC TEST SCHEDULING BY ORDERING TASKS FOR PERFORMANCE BASED ON SIMILARITIES BETWEEN THE TASKS

(75) Inventors: Christopher P. Arnold, Southampton (GB); Ian G. Holden, Wiltshire (GB); Lucas W. Partridge, Romsey (GB); Jonathan S. Tilt, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 12/873,483

(22) Filed: Sep. 1, 2010

(65) Prior Publication Data

US 2012/0054756 A1    Mar. 1, 2012

(51) Int. Cl.
*G06F 9/46* (2006.01)
*G06F 9/48* (2006.01)

(52) U.S. Cl.
CPC .................................. *G06F 9/4881* (2013.01)
USPC ........................... 718/102; 718/103; 718/104

(58) Field of Classification Search
None
See application file for complete search history.

(56) References Cited

U.S. PATENT DOCUMENTS

| | | | | |
|---|---|---|---|---|
| 5,349,656 | A * | 9/1994 | Kaneko et al. | 718/102 |
| 6,014,760 | A | 1/2000 | Silva et al. | |
| 6,076,174 | A * | 6/2000 | Freund | 714/47.3 |
| 6,546,364 | B1 * | 4/2003 | Smirnov et al. | 703/22 |
| 6,829,764 | B1 | 12/2004 | Cohen et al. | |
| 6,842,022 | B2 | 1/2005 | Khoche | |
| 6,996,821 | B1 * | 2/2006 | Butterworth | 718/100 |
| 7,844,476 | B2 * | 11/2010 | Bonissone et al. | 705/4 |
| 8,032,885 | B2 * | 10/2011 | Fish | 718/101 |
| 8,336,051 | B2 * | 12/2012 | Gokulakannan | 718/101 |
| 2003/0120700 | A1 * | 6/2003 | Boudnik et al. | 709/102 |
| 2004/0015976 | A1 * | 1/2004 | Lam | 718/104 |
| 2004/0255301 | A1 * | 12/2004 | Turski et al. | 719/316 |
| 2005/0039184 | A1 * | 2/2005 | Kunze et al. | 718/103 |
| 2005/0081208 | A1 * | 4/2005 | Gargya et al. | 718/100 |
| 2005/0198639 | A1 * | 9/2005 | Matsui | 718/100 |
| 2006/0010448 | A1 | 1/2006 | Sathe | |
| 2006/0156273 | A1 * | 7/2006 | Narayan et al. | 717/100 |
| 2007/0118838 | A1 * | 5/2007 | Tsujino et al. | 718/103 |
| 2007/0143765 | A1 * | 6/2007 | Aridor et al. | 718/104 |
| 2007/0168970 | A1 * | 7/2007 | Li et al. | 717/124 |
| 2007/0283355 | A1 * | 12/2007 | Misono et al. | 718/102 |
| 2008/0034370 | A1 * | 2/2008 | Huizenga | 718/104 |
| 2008/0155550 | A1 * | 6/2008 | Tsafrir et al. | 718/103 |

(Continued)

OTHER PUBLICATIONS

Miller, "Automated Testing Framework for Automation Success", 2 pages, posted Jul. 12, 2009.

(Continued)

*Primary Examiner* — Abdullah Al Kawsar
*Assistant Examiner* — Tammy Lee
(74) *Attorney, Agent, or Firm* — Terry Carroll; Edell, Shapiro & Finnan, LLC

(57) ABSTRACT

According to one embodiment of the present invention, a system dynamically schedules performance of tasks, and comprises a computer system including at least one processor. The system determines resources required or utilized by each task for performance of that task on a target system, and compares the determined resources of the tasks to identify tasks with similar resource requirements. The identified tasks with similar resource requirements are scheduled to be successively performed on the target system. Embodiments of the present invention further include a method and computer program product for dynamically scheduling performance of tasks in substantially the same manner described above.

12 Claims, 4 Drawing Sheets

(56) References Cited

U.S. PATENT DOCUMENTS

| | | |
|---|---|---|
| 2008/0234967 A1 | 9/2008 | Vandewiele et al. |
| 2008/0282253 A1* | 11/2008 | Huizenga .................... 718/104 |
| 2009/0106763 A1* | 4/2009 | Zhong ......................... 718/104 |
| 2009/0113434 A1* | 4/2009 | Podila ......................... 718/102 |
| 2009/0307763 A1 | 12/2009 | Rawlins et al. |
| 2009/0320033 A1* | 12/2009 | Gokhale et al. .............. 718/103 |
| 2009/0320037 A1* | 12/2009 | Gokhale et al. .............. 718/104 |
| 2010/0043002 A1* | 2/2010 | Fujiwara ...................... 718/102 |
| 2010/0115048 A1* | 5/2010 | Scahill ......................... 709/213 |
| 2010/0299671 A1* | 11/2010 | Kinsey ......................... 718/104 |
| 2011/0225644 A1* | 9/2011 | Pullikottil et al. ............. 726/11 |
| 2012/0260255 A1 | 10/2012 | Arnold et al. |

OTHER PUBLICATIONS

"Test Manager", manageengine.com/products/qengine/test-manager.html, retrieved from Internet Jul. 14, 2010.

* cited by examiner

DYNAMIC TEST SCHEDULING BY ORDERING TASKS FOR PERFORMANCE BASED ON SIMILARITIES BETWEEN THE TASKS

BACKGROUND

1. Technical Field

The present invention embodiments relate to scheduling of tasks and, more specifically, to dynamic scheduling of tests or other tasks for target machines or systems based on the similarity of resources required or utilized to perform the tests.

2. Discussion of the Related Art

Users of automated software testing systems may schedule tests to be performed unattended at various instances, including at a set time, regularly at periodic intervals, or in response to a new build of software becoming available. An example of a testing system includes the IBM Rational Quality Manager.

Automated testing systems maintain a queue or list of requested tests. The tests within the queue are considered independently, and blindly executed in the order of insertion into the queue which is based on arrival of the corresponding test request. Specifically, when a test within the queue becomes available to be performed (e.g., reaches the front of the queue), the hardware and software requirements for that test are determined. A pool of available hardware is scanned for one or more machines that accommodate the requirements for the test. If one or more machines are identified that accommodate the test requirements, the test is immediately dispatched to execute on the identified machines. Otherwise, the test is forced to wait until appropriate machines become available.

Once the available test is processed, the next test in the queue is subsequently considered (even while a prior test may still be executing). The above process is repeated until each test in the queue has been performed, or all tests within the queue that have not been performed are forced to wait due to unavailable machines.

BRIEF SUMMARY

According to one embodiment of the present invention, a system dynamically schedules performance of tasks, and comprises a computer system including at least one processor. The system determines resources required or utilized by each task for performance of that task on a target system or machine, and compares the determined resources of the tasks to identify tasks with similar resource requirements. The identified tasks with similar resource requirements are scheduled to be successively performed on the target system. Embodiments of the present invention further include a method and computer program product for dynamically scheduling performance of tasks in substantially the same manner described above.

DETAILED DESCRIPTION

Present invention embodiments pertain to dynamic scheduling of tests or other tasks based on resources utilized or required by those tests or other tasks. The tests are typically placed in a queue for subsequent execution. If the tests are considered independently, and blindly executed in the order of placement within the queue (e.g., based on arrival of a corresponding test request), potential efficiencies may be overlooked when more than one of these tests share similar resource (e.g., hardware/software, etc.) requirements. By way of example, three tests (e.g., in the order of Test A, Test B, and Test C) reside in the queue with Test A and Test C including similar resource requirements. An order of performance for these tests based on similar resource requirements between Test A and Test C may include the order of Test A, Test C, and Test B. This new order (e.g., Test A, Test C, Test B) avoids the wasted time and processing within the original order (e.g., Test A, Test B, Test C) to needlessly uninstall and deprovision all or some of the resources (e.g., hardware/software, etc.) required by Test A, when these same resources must later be reinstalled and reprovisioned for Test C (e.g., after performance of Test B in the original order).

Present invention embodiments dynamically determine the most efficient ordering of tests or other tasks in order to enhance efficiency (e.g., enable more tests to be performed in the available time or enable tests to be performed in less time). Present invention embodiments compare the hardware/software or other resource requirements of tests or other tasks, and arrange the tests or other tasks in an order with the tests or other tasks having the most similar requirements adjacent each other. In other words, tests or other tasks with similar resource requirements are arranged in an order to be successively performed, thereby reducing the amount of unnecessary install/uninstall cycles for hardware utilized for the tests or other tasks. The reordering of tests preferably occurs in response to a new test being requested or the addition/removal of resources (e.g., addition or removal of hardware/software, etc.) since these conditions typically affect the tests and/or resources being compared.

Figure 1:
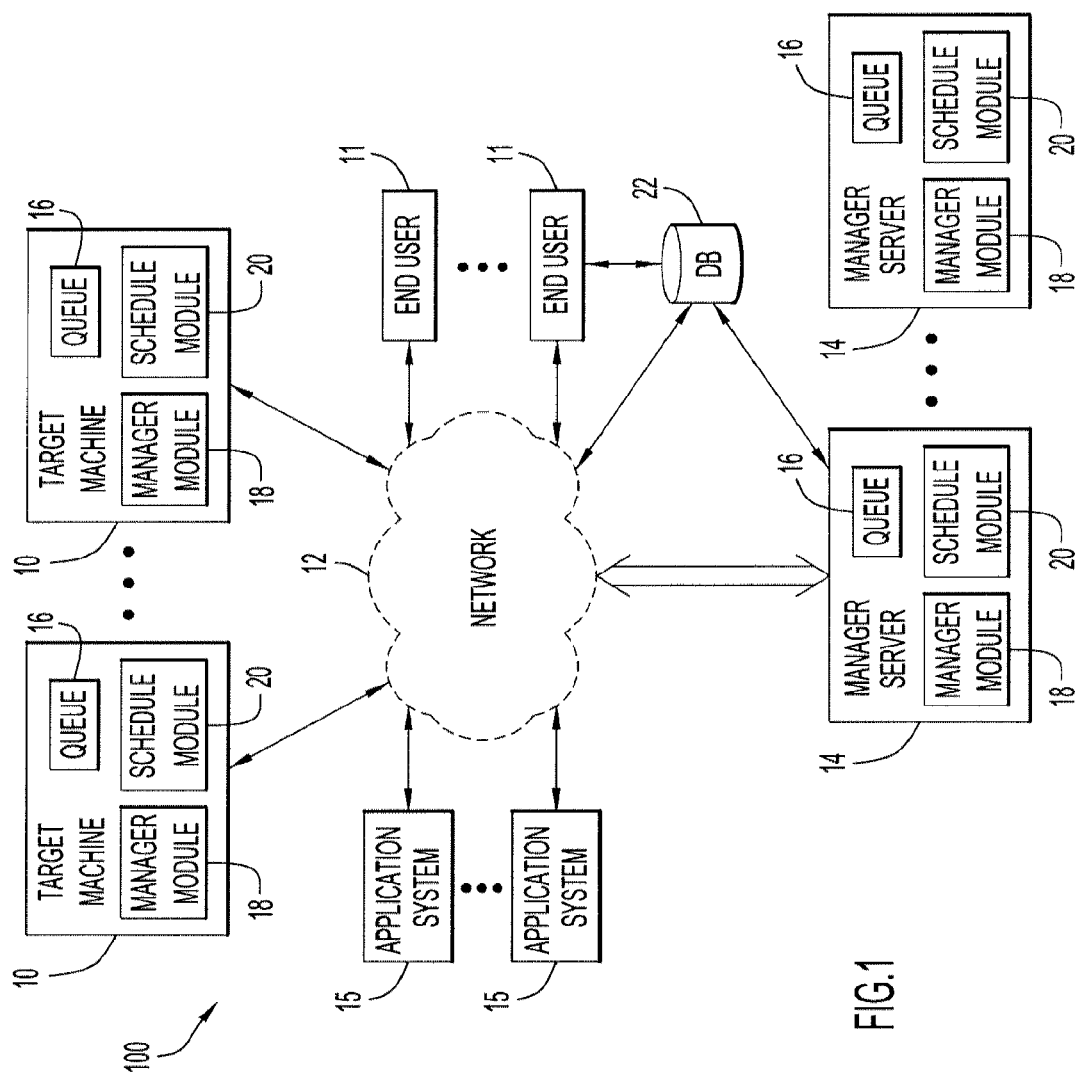
FIG. 1 is a diagrammatic illustration of an example network topology employed by a scheduling system according to an embodiment of the present invention.

An example topology employed by a scheduling system according to an embodiment of the present invention is illustrated in FIG. 1. Specifically, scheduling system 100 includes one or more target machines or systems 10, one or more end-user systems 11, and one or more manager servers 14. Target machines 10, end-user systems 11, and manager servers 14 may be remote from each other and communicate over a network 12. The network may be implemented by any number of any suitable communications media (e.g., wide area network (WAN), local area network (LAN), Internet, Intranet, etc.). Alternatively, target machines 10 and/or end-user systems 11 may be local to each other and/or manager servers 14, and communicate via any appropriate local communication medium (e.g., local area network (LAN), hardwire, wireless link, Intranet, etc.).

End-user systems 11 enable users to request performance of tests or other tasks by target machines 10. The end-user systems may present a graphical user (e.g., GUI, etc.) or other interface (e.g., command line prompts, menu screens, etc.) to solicit information from users pertaining to the desired tests or other tasks to be performed and associated information (e.g., resource requirements, etc.). The end-user systems generate requests for these tests that are provided to appropriate ones of manager servers 14 for processing. Alternatively, software applications (e.g., testing applications, build applications, etc.) executed by end-user systems 11 and/or one or more application systems 15 (e.g., application server, etc.) may automatically generate requests to have tests or other tasks performed by target machines 10 in accordance with the functions of those applications. Application systems 15 may be local to or remote from manager servers 14, and may communicate with the manager servers via the local communication media and/or network 12 described above.

The requests for tests or other tasks may include any suitable format or arrangement, and any information pertaining to the specific test or other task being requested (e.g., name or identification, resource requirements (e.g., minimum disk space, processor speed and memory requirements, operating system type and version, JAVA vendor and version, any applications that must be pre-installed, database brand, version and driver levels, etc.), particular target machines, etc.).

Alternatively, a test or other task may be registered with scheduling system 100. In this case, the interface of end-user systems 11 may enable a user to enter the information (e.g., resource requirements, etc.) for a test or other task. The entered information may be communicated to and stored by manager servers 14, or stored by the manager servers or end-user systems in a local or remote database system 22. The database system may be accessible by the end-user systems and manager servers via the local communication media or network 12 described above. The information may be stored and retrieved based on any suitable test or task identifier (e.g., name, identification, etc.). Database system 22 preferably includes, or is in the form of, a database server. The database server may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, database access software, etc.).

End-user systems 11 and/or application systems 15 may determine the appropriate manager server to receive the request based on information associated with the test or other task and manager servers (e.g., target machines for the test or other task, available resource or processing requirements, etc.). Manager servers 14 receive and process requests for tests or other tasks from end-user systems 11 and/or application systems 15. In particular, each manager server includes a queue 16, a manager module 18, and a schedule module 20. Manager module 18 receives the requests for tests or other tasks from end-user systems 11 and/or application systems 15, and places the tests or other tasks within queue 16 for subsequent execution. Schedule module 20 evaluates the tests or other tasks in queue 16 to reorder the performance of those tests or other tasks to enhance efficiency in accordance with present invention embodiments as described below. Once the tests or other tasks have been reordered, manager module 18 retrieves each test or other task from queue 16, and enables performance of the tests or other tasks in the determined order by appropriate ones of target machines 10. For example, each target machine 10 may include an agent module (e.g., hardware and/or software modules or units) to receive instructions from manager servers 14 to appropriately configure itself for the test or other task, perform the test or other task, and deconfigure itself after completion of the test or other task.

Manager servers 14, end-user systems 11, and application systems 15 may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, manager module, schedule module, browser/interface software, etc.). Target machines 10 may be implemented by any suitable hardware (e.g., circuitry, electronic devices, etc.) or hardware/software (e.g., processor based, etc.) system. For example, target machines 10 may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available and/or custom software (e.g., communications software, test or other task handling software, etc.). Queue 16 may be implemented by one or more of any suitable data or other storage structures or units of any suitable storage capacity to store tests or other tasks in an order of execution. Further, queue 16 may be implemented in hardware (e.g., memory device, buffer, etc.), software (e.g., queue, stack, linked list, array, etc.), or any combination thereof. In addition, manager module 18 and schedule module 20 may be implemented by any combination of software and/or hardware modules or units.

Alternatively, a target machine 10 may process requests for tests or other tasks when operating as a stand-alone (e.g., generating its own requests) or in a networked configuration (e.g., receiving requests from end-user systems 11 and/or application systems 15). In a stand-alone mode of operation, the target machine may include a user interface (e.g., GUI, menu screens, line prompts, etc.) to receive information from a user pertaining to performance of desired tests or other tasks and corresponding test or task information (e.g., resource requirements, etc.). In addition, the interface may enable registration of a test or other task with the target machine. The information may be stored locally in the target machine, or within a local or remote storage unit (e.g., local or remote database system 22, etc.).

Each target machine may include queue 16, manager module 18, and schedule module 20, each substantially similar to the corresponding components described above. Manager module 18 receives requests for tests or other tasks (e.g., from target machine 10 in a stand-alone configuration or from end-user systems 11 and/or application systems 15 in a networked configuration), and places the tests or other tasks within queue 16 for subsequent execution in substantially the same manner described above. Schedule module 20 evaluates the tests or other tasks in queue 16 to reorder the performance of those tests or other tasks to enhance efficiency in accordance with present invention embodiments as described below. Once the tests or other tasks have been reordered, manager module 18 retrieves each test or other task from queue 16, and enables performance of the tests or other tasks in the determined order by the target machine.

Figure 2:
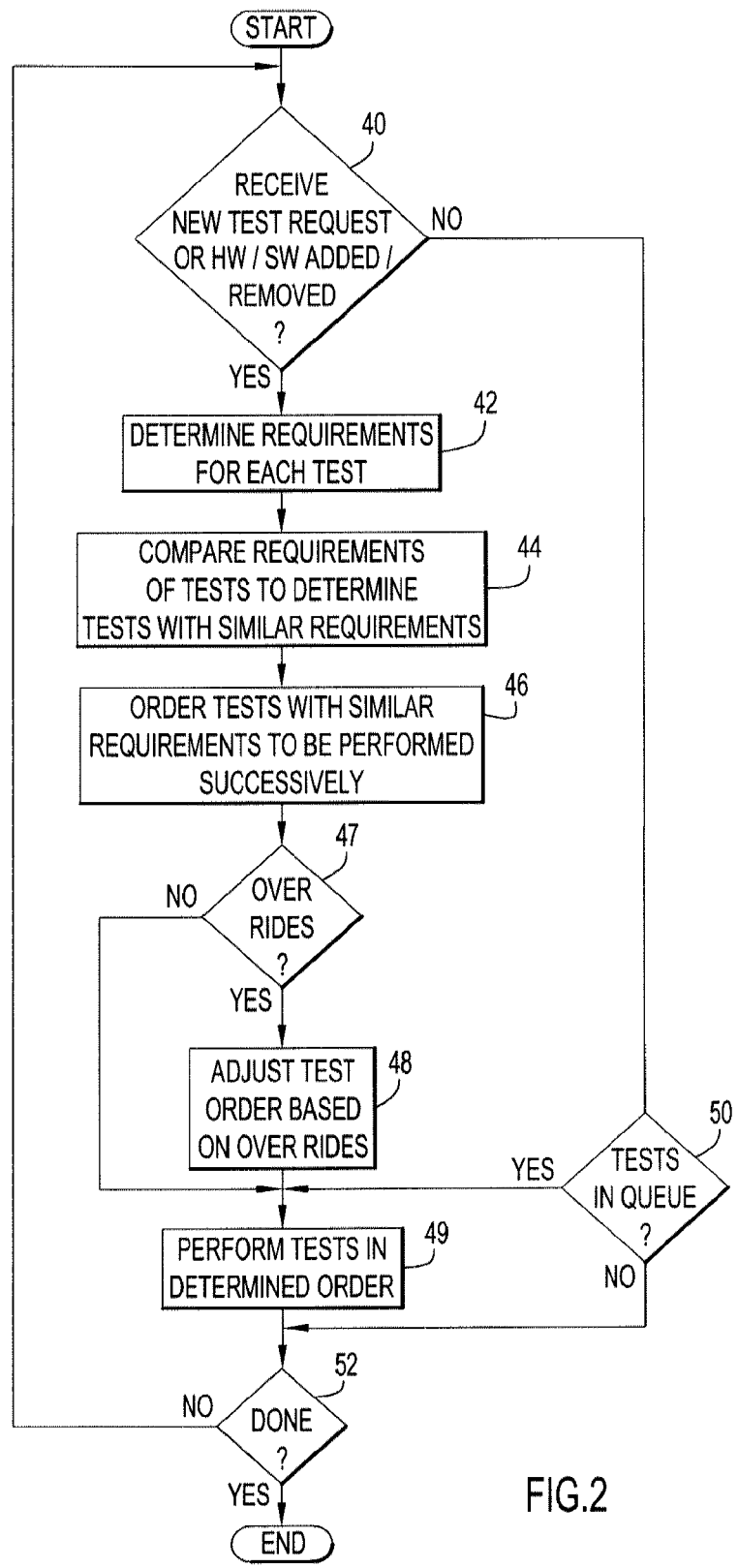
FIG. 2 is a procedural flow chart illustrating the manner in which tests are scheduled according to an embodiment of the present invention.

The manner in which the performance of requested tests (or other tasks) is dynamically scheduled according to an embodiment of the present invention is illustrated in FIG. 2. Initially, the dynamic scheduling may be performed by a manager server 14 or, alternatively, by a target machine 10 (e.g., in stand-alone and networked configurations) (e.g., via manager module 18 and schedule module 20) with respect to requested tests (or other tasks) within a corresponding queue 16. One or more end-users and/or software applications may request performance of tests (e.g., by one or more target machines 10, any target machines having specified requirements (e.g., Linux or other specified operating system, etc.)) via end-user systems 11 and/or application systems 15 as described above. The end-user and/or application systems generate requests for these tests that are provided to appropriate ones of manager servers 14 or target machines 10 (e.g., in a networked configuration) for processing. Alternatively, requests may be generated by target machine 10 in a stand-alone configuration.

In particular, the presence of a request for a new test, or a change in the configuration (e.g., addition/removal of hardware/software, etc.) of one or more target machines 10 is determined at step 40. Newly requested tests are placed in queue 16. In the case of a stand-alone target machine performing the dynamic scheduling, the target machine determines the presence of a change in configuration for that particular machine.

When a new test request is received or a configuration change for one or more test machines 10 is detected, the resource requirements for each requested test within queue 16 (e.g., including a newly requested test) is determined at step 42. The resource requirements for each test may be provided within the corresponding test request, or retrieved from appropriate storage (e.g., target machine 10, manager server 14, database system 22, etc.) in the case where resource requirement information is absent from the test request. The resource requirements for each test are preferably stored in a matrix or other data structure to enable comparison of the resource requirements of the tests in order to identify similar tests. The matrix or other data structure may include any suitable format or arrangement (e.g., tabular, single or multi-dimensional arrays, lists, queues, and/or stacks, etc.) and storage capacity to store the information.

Once the resource requirements for the tests are ascertained, the resource requirements of the tests are compared to identify tests with similar resource requirements at step 44. For example, requested tests that have identical or matching resource requirements may be considered to be similar. One or more groups of similar tests may be formed, where each group is associated with a different set of resource requirements and each test within that group includes the resource requirements associated with the group.

A set of score values may alternatively be determined for each requested test, where each score value within the set represents the similarity between that test and one other requested test. Various techniques may be employed to determine the set of score values (or similarities) for each requested test. For example, a score value for a requested test indicating similarity to another requested test may be produced by determining the quantity of similar resource requirements for the tests. Resource requirements that are the same (e.g., identical or matching), compatible (e.g., each test under comparison is able to be performed with the resource requirement for at least one of the tests), and/or within a certain range of each other are considered to be similar.

By way of example, each test under comparison includes a resource requirement of minimum disk space having a value of 100 Megabytes (MB). This resource requirement for the tests is considered to be similar by virtue of being identical or matching and, therefore, contributes to the quantity or score value. Further, the minimum disk space resource requirement may include a value of 100 Megabytes (MB) for one test and 110 MB for another test. This resource requirement for the tests may be considered to be similar by virtue of being compatible since a minimum disk space of 110 MB is capable of accommodating a test requiring a minimum disk space of 100 MB. Thus, the minimum disk space requirement in this case similarly contributes to the quantity or score value.

Moreover, each test under comparison may further include a resource requirement of processor speed having a value of 2 GHz for one test and a value of 2.1 GHz for another test. This resource requirement for the tests may be considered to be similar by virtue of being within a certain range of each other (e.g., a percentage range, an absolute offset range, etc.), thereby contributing to the quantity or score value.

The differences between corresponding resource requirements of tests under comparison may alternatively be determined, and subsequently combined (e.g., added, etc.) to determine a score value reflecting the closeness of the resource requirements between those tests. This technique may be applied in cases where a suitable quantity of resource requirements include values representing measurable and preferably numeric characteristics (e.g., memory capacity, speed, etc.).

The score value may further be determined based on a weighted combination of comparison results. In this case, one or more of the corresponding resource requirements of tests under comparison are associated with a weight value. This enables control of the effect of resource requirements on the similarity comparisons. For example, resource requirements having greater time consuming effects with respect to initialization of a test or tear down of the test (e.g., restoring a target machine to the state prior to the test) may be associated with greater weight values, thereby enabling tests having the same or similar initialization and/or tear down requirements to be ordered successively to avoid repeated time consuming initializations and/or tear downs. The weights may be applied to the results of the resource requirement comparison between requested tests, and combined (e.g., added, etc.) to determine the score value. By way of example, weights of resource requirements having values considered to be similar (e.g., the same, compatible, and/or within a certain range) for tests under comparison may be combined or added to produce a weighted sum as the score value (e.g., applying or multiplying the weight value by one for similar resource requirements and applying or multiplying the weight value by zero for different resource requirements). The score value may alternatively be produced by applying (e.g., multiplying, etc.) weight values to the differences between resource requirement values for the tests, and combining or adding the resulting difference values.

The particular resource requirements compared may be a subset (e.g., all resource requirements or any portion thereof) of the entire set of resources required. In this fashion, the resource requirements having greater effects may be specified to be compared for similarity. The particular resource requirements to compare and associated information (e.g., similarity criteria (e.g., same values, compatible values, range information, etc.), quantity or difference for determination of a score value or weighted score value, thresholds, weights, etc.) may be specified within the request, or more typically, provided during registration of the test or other task with scheduling system 100 or target machine 10 in substantially the same manner described above.

The set of score values for each requested test is preferably stored in the matrix for analysis to identify tests with similar resource requirements. Tests are considered to be similar when the score value representing the similarity between tests is equal to or exceeds a predetermined threshold. In this case, the threshold may be set to any suitable value to provide a desired similarity between tests and maximize efficiency. For example, the threshold may be set to enable all or any portion of the specified resource requirements for tests to be similar to indicate test similarity. This enables a similarity comparison to be conducted even in cases where a test includes one or more resource requirements absent from another test.

The set of score values for each requested test is evaluated to determine the score values indicating a similarity between that requested test and other requested tests. Basically, the set of score values for each test is examined to identify score values that are equal to or exceed the threshold. The requested tests associated with the identified score values indicate the requested tests with similar resource requirements to the requested test associated with the score value set. Tests with similar resource requirements are grouped together for placement in queue 16 to provide successive performance of those tests. In the case where one or more tests reside in plural groups of similar tests, each of these tests is preferably placed in the group with which the test has the greatest similarity (or score value). However, any suitable technique for limiting placement of a test to a single group of similar tests may be employed (e.g., random, first/last group receiving a test, etc.).

Once the groups of similar tests are identified (e.g., based on matching of resource requirements or comparison of score values), the requested tests are arranged within queue 16 to enable the requested tests within each group of similar tests to be successively performed at step 46. The groups of similar tests are preferably arranged (in queue 16 of manager server 14 or target machine 10) with the groups having the greatest similarity positioned adjacent each other to enable successive performance of the requested tests within these groups. The similarity between groups may be determined based on closeness of (e.g., quantity of common) resource requirements, or any combination of the score values representing the similarity between tests within those groups (e.g., greater group score average or total score values, etc.). This further enhances the efficiency of transitions between performance of tests within successive groups. However, the groups of similar tests may be arranged within the queue in any fashion.

Manual or automated overrides may be applied to the dynamic scheduling. The override requirements may be entered by a user via the interface of end-user systems 11 or a target machine 10, provided by applications from application systems 15, and/or be predetermined and incorporated into scheduling system 100. The override requirements may be specified within the request, or provided during registration of a test in substantially the same manner described above. The override requirements may include any desired conditions relating to performance of a test (e.g., to prevent a test from being moved down the queue or list more than a predetermined number of times, to prevent the test from being delayed for more than a specified time interval (e.g., hours, minutes, seconds, etc.), ensure performance of the test periodically for a specified time interval (e.g., hours, minutes, seconds, etc.), etc.). If one or more override requirements exist as determined at step 47, the order of requested tests is adjusted to comply with the override requirements at step 48.

Performance of the requested tests is subsequently enabled based on the order of the requested tests in queue 16 at step 49. In particular, the requested tests are individually retrieved from the queue, and are initiated on a target machine. The target machine is loaded or provisioned with the appropriate resources or environment (e.g., creating an appropriate virtual machine, etc.) for the retrieved test, and the test is executed to provide test results.

The presence of a new test request or modified configuration (e.g., a new target machine is added, an existing target machine is temporarily removed for maintenance or other purposes, etc.) is again determined at step 40 (e.g., even when tests may be executing). When neither of these conditions is detected, execution of requested tests continues until each test has been performed as determined at step 50. When either of these conditions is detected, any execution of current and/or subsequent tests in the queue is halted, and the requested tests in the queue are reordered in substantially the same manner described above. The above scheduling process is repeated until a terminating condition occurs as determined at step 52.

An example of operation of a present invention embodiment to schedule tests is described. Initially and by way of example, a Test X is being executed on a single target machine, where a Test A and a Test B are each waiting in a queue to be executed. Test A and Test B both require the same operating system and hardware requirements; however, Test A requires IBM DB2 v8 (DB2 version 8) whereas Test B requires DB2 v9 (DB2 version 9). A user or automated process requests Test C to be performed, where Test C also requires DB2 v8 (DB2 version 8).

Without rescheduling (and assuming Test X has no requirements in common with Tests A-C), the performance of Tests A-C includes the following order of operations.
1. Test A: Install DB2 v8
2. Test A: Run Test A
3. Test A: Uninstall DB2 v8
4. Test B: Install DB2 v9
5. Test B: Run Test B
6. Test B: Uninstall DB2 v9
7. Test C: Install DB2 v8
8. Test C: Run Test C
9. Test C: Uninstall DB2 v8

A present invention embodiment detects that Test C has the same or similar requirements as Test A and, therefore, may reorder the tests for performance in the order of Test A, Test C, and Test B. The order of operations may be as follows.
1. Test A: Install DB2 v8
2. Test A: Run Test A
3. Test C: Run Test C (without provisioning since the requirements are the same as Test A)
4. Test C: Uninstall DB2 v8
5. Test B: Install DB2 v9
6. Test B: Run Test B
7. Test B: Uninstall DB2 v9

The rescheduling of the order of performance by a present invention embodiment to Test A, Test C, and Test B removes two operational steps (e.g., uninstalling and installing DB2 v8). The order may alternatively be modified to Test B, Test A, and Test C (e.g., when a user has indicated that Test B is to be performed as soon as possible) to yield similar results. The tests within the above example of operation are assumed to perform clean-up to avoid unintentionally affecting the results of other tests. For example, Test A does not leave any artifacts in DB2 that may affect the outcome of Test C.

Figure 3:
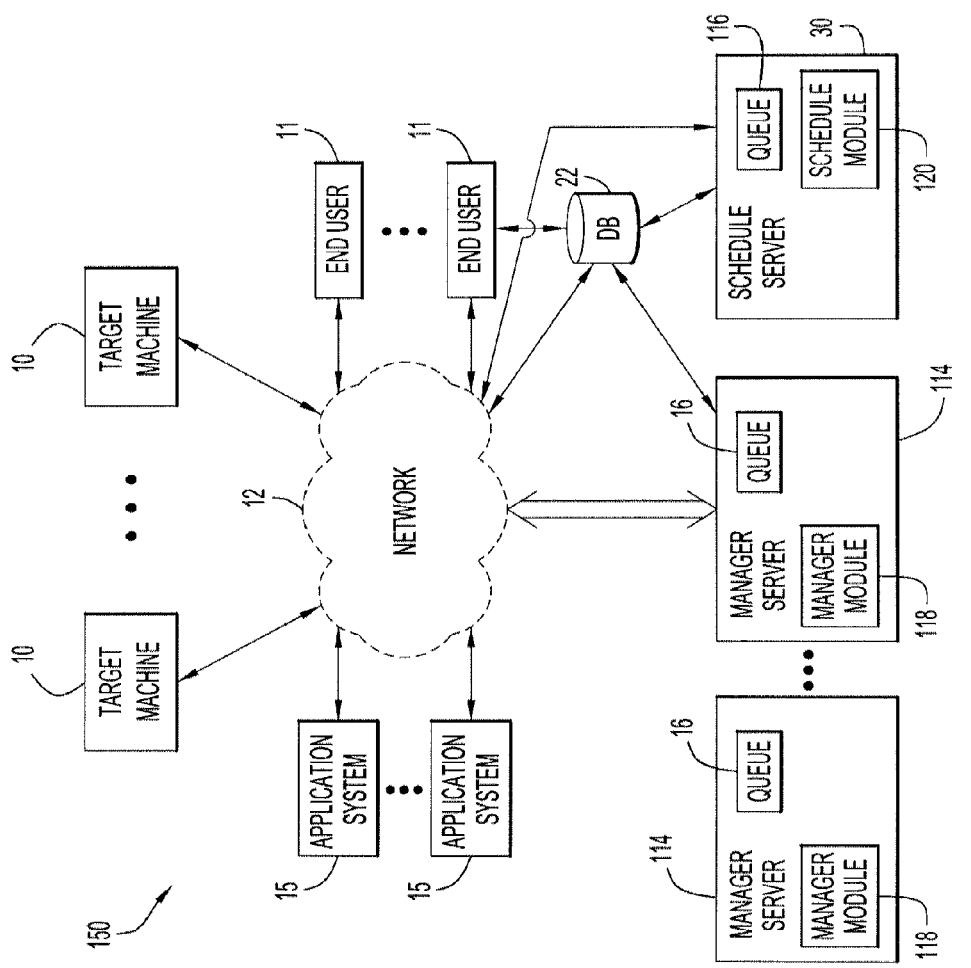
FIG. 3 is a diagrammatic illustration of an example network topology employed by a scheduling system according to an alternative embodiment of the present invention.

An example topology employed by a scheduling system according to an alternative embodiment of the present invention is illustrated in FIG. 3. Initially, scheduling system 150 is similar to scheduling system 100 described above, and enables ordering of tests or other tasks on a global level across a plurality of manager servers. Specifically, scheduling system 150 includes one or more target machines or systems 10, one or more end-user systems 11, one or more manager servers 114, and a schedule server 30. The target machines, end-user systems, manager servers, and schedule server may be remote from each other and communicate over network 12. Alternatively, these components may be local to each other and communicate via any appropriate local communication medium (e.g., local area network (LAN), hardwire, wireless link, Intranet, etc.). Target machines 10 and network 12 are substantially similar to the target machines and network described above.

End-user systems 11 enable users to request performance of tests or other tasks by target machines 10 and enter information (e.g., resource requirements, etc.) via a graphical user (e.g., GUI, etc.) or other interface (e.g., command line prompts, menu screens, etc.) in substantially the same manner described above. The end-user systems generate requests for these tests that are provided to appropriate ones of manager servers 114 for processing in substantially the same manner described above. Alternatively, software applications (e.g., testing applications, build applications, etc.) executed by end-user systems 11 and/or one or more application systems 15 (e.g., application server, etc.) may automatically generate requests to have tests or other tasks performed by target machines 10 in accordance with the functions of those applications in substantially the same manner described above. Application systems 15 may be local to or remote from manager servers 114 and schedule server 30, and may communicate via the local communication media and/or network 12 described above.

The requests for tests or other tasks are substantially similar to the requests described above, and may include any suitable format or arrangement and any information pertaining to the specific test or other task being requested. The test or task may alternatively be registered with scheduling system 150 in substantially the same manners described above. In the case of test registration, the interface of end-user systems 11 may enable a user to enter the information (e.g., resource requirements, etc.) for a test or other task. The entered information may be communicated to and stored by manager servers 114 or schedule server 30, or stored in local or remote database system 22. The database system may be accessible to end-user systems 11, manager servers 114, and schedule server 30 via the local communication media and/or network 12 as described above. The information may be stored and retrieved based on any suitable test or task identifier (e.g., name, identification, etc.) in substantially the same manner described above. The end-user systems 11 and/or application systems 15 may determine the appropriate manager server to receive the request based on the associated information. End-user systems 11, application systems 15, and database system 22 are substantially similar to the corresponding components (e.g., end-user systems, application systems, database system, etc.) described above.

Manager servers 114 are similar to the manager servers described above, and receive and process requests for tests or other tasks from end-user systems 11 and/or application systems 15. In particular, each manager server includes queue 16 and manager module 118. Queue 16 is substantially similar to the queue described above, while manager module 118 is similar to the manager module described above. Manager module 118 receives the requests for tests or other tasks from end-user systems 11 and/or application systems 15, and places the tests within queue 16 for reordering and subsequent execution as described below. In addition, manager module 118 provides communication with schedule server 30 to enable transference of the contents of queue 16 and other information from the manager server to the schedule server. This enables the schedule server to examine the tests within the queues of each of the manager servers for efficient ordering of those tests on a global basis as described below.

Schedule server 30 receives the test requests, queue contents, and other information from each of the manager servers, and evaluates the tests to determine an efficient schedule or order of performance. The resulting order is distributed to manager servers 114 for placement in their queues 16 for subsequent execution. The schedule server includes a queue 116, and a schedule module 120 that is similar to the schedule module described above. Queue 116 is similar to queue 16 described above, and may be implemented in hardware (e.g., memory device, buffer, etc.), software (e.g., queue, stack, linked list, array, etc.), or any combination thereof. Queue 116 receives the contents of queue 16 of each of the manager servers, while schedule module 120 evaluates the tests or other tasks in queue 116 (from manager servers 114) to reorder the performance of those tests to enhance efficiency in accordance with present invention embodiments as described below. Once the tests have been reordered, schedule module 120 distributes the reordered tests to the appropriate manager servers for storage in corresponding queues 16. Manager module 118 of manager servers 114 retrieves each test or other task from queue 16, and enables performance of the tests in the determined order by appropriate ones of target machines 10 in substantially the same manner described above. Manager module 118 and schedule module 120 may be implemented by any combination of software and/or hardware modules or units.

The end-user systems and application systems are substantially similar to the corresponding end-user and application systems described above. In addition, the end-user systems, application systems, manager servers, and schedule server may be implemented by any conventional or other computer systems preferably equipped with a display or monitor, a base (e.g., including the processor, memories and/or internal or external communications devices (e.g., modem, network cards, etc.)), optional input devices (e.g., a keyboard, mouse or other input device), and any commercially available and/or custom software (e.g., server/communications software, schedule module, manager module, etc.). Schedule server 30 is preferably implemented as a separate system. However, the schedule server may be implemented on one or more of manager servers 114.

Figure 4:
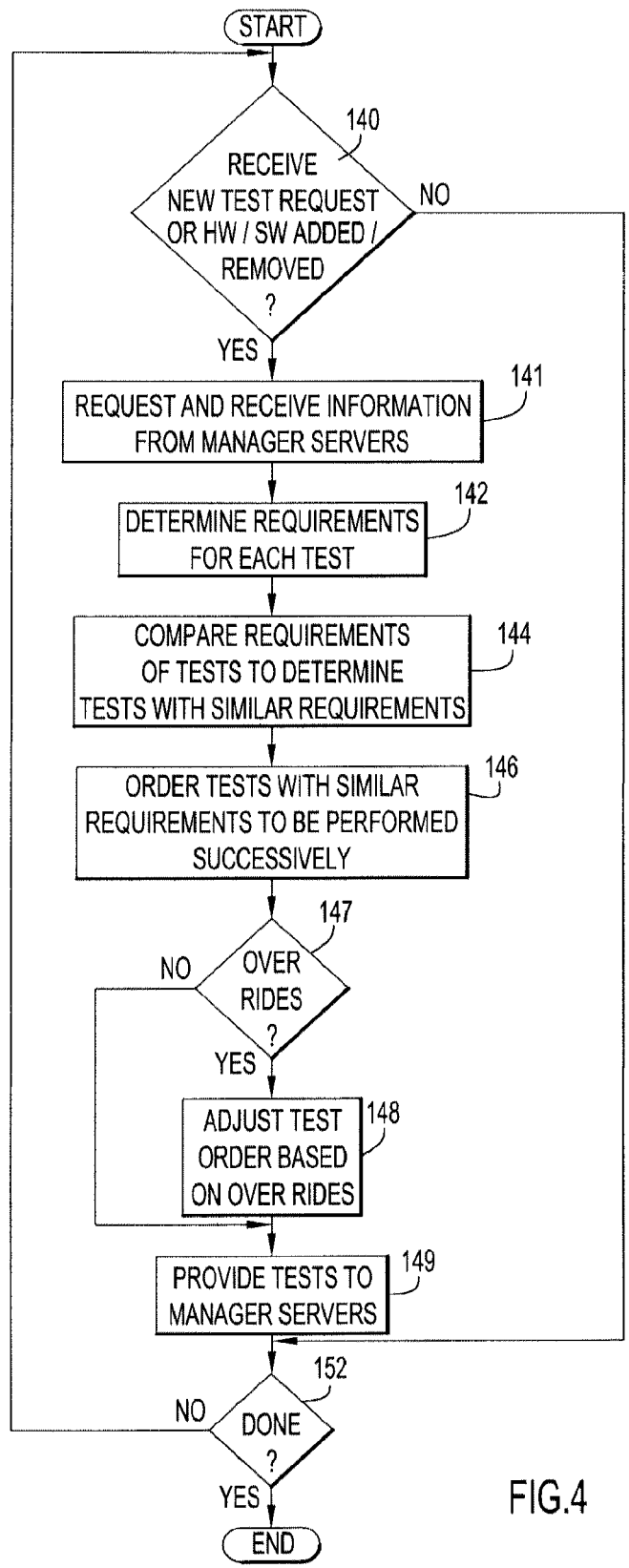
FIG. 4 is a procedural flow chart illustrating the manner in which tests are scheduled by the scheduling system of FIG. 3 according to an embodiment of the present invention.

The manner in which the performance of requested tests (or other tasks) is dynamically scheduled (e.g., by schedule server 30 via schedule module 120) according to an embodiment of the present invention is illustrated in FIG. 4. Initially, one or more end-users and/or software applications request performance of tests by one or more target machines 10 via end-user systems 11 and/or application systems 15 as described above. The end-user and/or application systems generate requests for these tests that are provided to appropriate ones of manager servers 114 for processing. The manager servers determine the presence of a request for a new test, or a change in the configuration (e.g., addition/removal of hardware/software, etc.) of one or more target machines, and forward appropriate notifications to schedule server 30. Newly requested tests are placed in corresponding queues 16. Alternatively, schedule server 30 may directly receive the test requests.

When notification of a new test or a configuration change is received by schedule server 30 as determined at step 140, the schedule server requests the manager servers to transfer the requested tests stored in corresponding queues 16 and associated information (e.g., resource requirements, test requests, etc.), where transferred information is received at step 141. The received tests are placed in queue 116, and the schedule server determines the resource requirements for each test received from a manager server at step 142. The resource requirements for each test may be provided within the information from the manager servers (e.g., corresponding test requests), or retrieved by schedule server 30 from database system 22 as described above (e.g., in the case where resource requirement information is absent from the test request). The resource requirements for each test are preferably stored in a matrix or other data structure to enable schedule server 30 to compare the resource requirements of the requested tests in order to identify similar tests. The matrix or other data structure may include any suitable format or arrangement (e.g., tabular, single or multi-dimensional arrays, lists, queues, and/or stacks, etc.) and storage capacity to store the information as described above.

Once the resource requirements for the tests are ascertained, schedule server 30 compares the resource requirements of the tests to identify tests with similar resource requirements at step 144. For example, requested tests that have identical or matching resource requirements may be considered to be similar in substantially the same manner described above. One or more groups of similar tests may be formed, where each group is associated with a different set of resource requirements and each test within that group includes the resource requirements associated with the group.

The schedule server may alternatively determine a set of score values for each requested test, where each score value within the set represents the similarity between that test and one other requested test. Various techniques may be employed to determine the set of score values (or similarities) for each requested test in substantially the same manners described above. For example, schedule server 30 may produce a score value for a requested test indicating similarity to another requested test by determining the quantity of similar resource requirements for the tests. Resource requirements that are the same (e.g., identical or matching), compatible (e.g., each test under comparison is able to be performed with the resource requirement value for at least one of the tests), and/or within a certain range of each other are considered to be similar as described above.

Further, the differences between corresponding resource requirements of tests under comparison may alternatively be determined, and combined (e.g., added, etc.) to determine a score value reflecting the closeness of the resource requirements between those tests in substantially the same manner described above. Moreover, schedule server 30 may determine the score value based on a weighted combination of comparison results in substantially the same manner described above. One or more of the corresponding resource requirements of tests under comparison are associated with a weight value that is applied to the comparison results (or differences between resource requirements), where the weighted results (or differences) are combined in substantially the same manner described above to determine a score value.

The particular resource requirements compared may be a subset (e.g., all resource requirements or any portion thereof) of the entire set of resources required. In this fashion, the resource requirements having greater effects may be specified to be compared for similarity. The particular resource requirements to compare and associated information (e.g., similarity criteria (e.g., same values, compatible values, range information, etc.), quantity or difference for determination of a score value or weighted score value, thresholds, weights, etc.) may be specified within the request, or provided during registration of the test or other task with scheduling system 150 and stored in database system 22 in substantially the same manner described above.

The set of score values for each requested test is preferably stored in the matrix for analysis to identify tests with similar resource requirements. Tests are considered to be similar when the score value representing the similarity between tests is equal to or exceeds a predetermined threshold in substantially the same manner described above.

Schedule server 30 evaluates the set of score values for each requested test to determine the score values indicating a similarity between that requested test and other requested tests in substantially the same manner described above. Basically, the set of score values for each test is examined to identify score values that are equal to or exceed the threshold. The requested tests associated with the identified score values indicate the requested tests with similar resource requirements to the requested test associated with the score value set. Tests with similar resource requirements are grouped together to provide successive performance of those tests. In the case where one or more tests reside in plural groups of similar tests, each of these tests is placed in the group with which the test has the greatest similarity (or score value). However, any suitable technique for limiting placement of a test to a single group of similar tests may be employed (e.g., random, first/last group receiving a test, etc.).

Once schedule server 30 identifies the groups of similar tests (e.g., based on matching of resource requirements or comparison of score values), the requested tests are arranged within queue 116 to enable the requested tests within each group of similar tests to be successively performed at step 146. Initially, schedule server 30 examines the tests within queue 116 to determine the appropriate manager servers to receive the groups of similar tests. In particular, groups of similar tests are assigned to corresponding manager servers 114 to enable performance of those tests. The schedule server may employ various criteria to determine an appropriate manager server for similar tests. For example, the schedule server may utilize resource requirements associated with a group of similar tests to determine an appropriate manager server. In this case, the resource requirements may be compared to current configurations of the target machines to determine the configurations closest to the resource requirements for the tests, where the tests are provided to the manager servers in communication with those target machines. Further, the tests may be assigned to manager servers 114 based on various characteristics of the manager server (e.g., the quantity of tests or load at the manager server, processing speed, type of machine or configuration, network or local traffic, etc.). An entire group of similar tests is preferably assigned to a manager server to avoid disjoint sets of similar tests which may degrade efficiency. However, a group of similar tests may be partitioned in any manner based on any suitable criteria for assignment of the partitions to manager severs 114.

Once the groups of similar tests have been assigned to manager servers 114, the assigned groups of similar tests for a manager server may be further arranged with the groups having the greatest similarity positioned adjacent each other to enable successive performance of the requested tests within these groups. The similarity between groups may be determined based on closeness of (e.g., quantity of common) resource requirements, or any combination of the score values representing the similarity between tests within those groups (e.g., greater group score average or total score values, etc.). This further enhances the efficiency of transitions between performance of tests within successive groups. However, the groups of assigned tests for a manager server may be arranged in any fashion. The assigned groups of similar tests are preferably arranged in queue 116 based on the corresponding manager server receiving that group.

Scheduling system 150 may allow manual or automated overrides to the test scheduling in substantially the same manner described above. The override requirements may be entered by a user via the interface of end-user systems 11, provided by applications from application systems 15, and/or be predetermined and incorporated into scheduling system 150. The override requirements may be specified within the request, or provided during registration of a test with scheduling system 150 and stored in database system 22 in substantially the same manner described above. The override requirements may include any desired conditions relating to performance of a test (e.g., to prevent a test from being moved down the queue or list more than a predetermined number of times, to prevent the test from being delayed for more than a specified time interval (e.g., hours, minutes, seconds, etc.), ensure performance of the test periodically for a specified time interval (e.g., hours, minutes, seconds, etc.), etc.). If the schedule server determines one or more override requirements exist at step 147, the order of requested tests is adjusted to comply with the override requirements at step 148.

Once the groups of tests have been ordered and assigned, the tests are provided to their corresponding assigned manager servers 114 at step 149. Since a manager server 114 may receive different tests from schedule server 30 for execution after a dynamic scheduling, the manager servers may further receive from schedule server 30 associated test information (e.g., test requests, resource requirements, etc.). This information is preferably stored by the manager server (e.g., locally or in database system 22). The information may be utilized for performance of the tests, and may be transferred back with the tests in queue 16 to schedule server 30 for a subsequent dynamic scheduling of the tests.

Manager servers 114 receive the ordered tests from schedule server 30, and place the tests in corresponding queues 16 for subsequent execution. Manager servers 114 retrieve the requested tests from queue 16, and initiate the retrieved test at an appropriate target machine 10. The target machine is loaded or provisioned with the appropriate resources or environment (e.g., creating an appropriate virtual machine, etc.) for the retrieved test, and executes the test to provide test results.

The schedule server again determines the presence of notification of a new test request or modified configuration at step 140 (e.g., even when tests may be executing). When neither of these conditions is detected, manager servers 114 continue to execute requested tests within corresponding queues 16 until each test has been performed. When a notification of either of these conditions is received at schedule server 30, any execution of current and/or subsequent tests in queues 16 is halted, and the requested tests in queues 16 of manager servers 114 are reordered in substantially the same manner described above. The above scheduling process is repeated until a terminating condition occurs as determined at step 152.

The present invention embodiments are not limited to the specific tasks or algorithms described above. For example, present invention embodiments may be employed for smart scheduling of build requests, especially where build requests for a product on different operating systems are queued on the same system. In this case, build requests with similar hardware and/or other requirements may be positioned adjacent in the queue for successive performance to reduce hardware reprovisioning cycles in substantially the same manner as described above. Further, various sophisticated algorithms may be employed by present invention embodiments to order performance of tests or other tasks, including techniques from CPU task scheduling, Operating System (OS) task scheduling, and/or workflow task scheduling.

It will be appreciated that the embodiments described above and illustrated in the drawings represent only a few of the many ways of implementing embodiments for dynamic test scheduling.

The topology of the present invention embodiments may include any number of computer or other processing systems (e.g., end-user systems, schedule servers, manager servers, target machines, database systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, Apple, Macintosh, laptop, PDA, etc.), and may include any commercially available operating system (e.g., Windows, OS/2, Unix, Linux, etc.) and any commercially available or custom software (e.g., browser software, communications software, server software, manager and scheduling software, etc.). These systems may include any types of monitors and input devices (e.g., keyboard, mouse, voice recognition, etc.) to enter and/or view information. The target machines may be implemented by any suitable hardware (e.g., circuitry, electronic devices, etc.) or hardware/software (e.g., processor based, etc.) system. For example, the target machines may be implemented by any conventional or other computer systems.

It is to be understood that the software (e.g., manager module, schedule module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user, manager server, application, schedule server, database, and target machine systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., manager module, schedule module, etc.) may be available on a recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. The local communication media may be implemented by any suitable communication media (e.g., local area network (LAN), hardwire, wireless link, Intranet, etc.).

The database system may be implemented by or include any number of any conventional or other databases, data stores or storage structures (e.g., files, databases, data structures, data or other repositories, etc.). The database system may be remote from or local to the computer or other processing systems.

The test or other task information may include any desired information pertaining to the test or other task (e.g., operating or machine environment, resource requirements, identifiers, weights, manners of determining score values, similarity requirements, etc.). The resource requirements for a test may include any quantity of any desired resources that is, or may be, needed for performance of the test or other task (e.g., minimum disk space, processor speed and memory requirements, operating system type and version, JAVA vendor and version, any applications that must be pre-installed, database brand, version and driver levels, particular target machines, etc.). All or any portion of the information for a test or other task may be stored in any number of databases, data repositories, or storage units that may be local to or remote from each other.

The test or other task request may be in any desired format, and include any desired information (e.g., resource requirements, identifiers, target machines or addresses, etc.). The notification (e.g., for a new test or other task or configuration change) may be in any desired format, and include any desired information (e.g., event type, event time, machine originating event, etc.). The notification may be detected in any fashion (e.g., packet inspection, interrupts, etc.).

Any desired identifiers or indicators may be placed in the queues to indicate the test or other task to be performed (e.g., the request, identification, address or location of the test or task, etc.). The queues may be may be implemented in hardware (e.g., memory device, buffer, etc.), software (e.g., queue, stack, linked list, array, etc.), or any combination thereof. The queues may utilize any desired scheme compatible with ordering of the tests or other tasks for placement and removal of the ordered tests or other tasks from the queue (e.g., FIFO, LIFO, etc.). The matrix may be implemented by any quantity of any suitable memory devices or data structures, may include any suitable format or arrangement (e.g., tabular, single or multi-dimensional arrays, lists, queues, and/or stacks, etc.), and any suitable storage capacity to store the information.

The present invention embodiments may employ any number or type of user interface (e.g., Graphical User Interface (GUI), command-line, prompt, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The similarity between tests or other tasks may be determined in various fashions, where resource requirements may be compared in any suitable manner. For example, tests with identical resource requirements, or a certain quantity of identical resource requirements may be considered similar. Further, a score value measuring closeness of resource requirements of tests may be determined in any fashion. By way of example, the score value may be based on a quantity of similar resource requirements, differences between resource requirements, a weighted computation of resource requirement comparisons, or any combinations thereof. Comparisons of individual resource requirements may be combined in any fashion (e.g., added, averaged, weighted, etc.) to produce a score value. The score value threshold for determining similarity may be set to any suitable values to control the degree of similarity and grouping of tests or other tasks. The score value may be compared to the threshold in any suitable manner to determine similarity (e.g., greater than, equal to, not equal to, less than, any combinations thereof, etc.). The score value may be utilized for comparison of any quantity of tests or other tasks. For example, a score value may represent a comparison of resource requirements for two or more tests.

Any suitable resource requirements (e.g., all or any portion of the resource requirements) may be specified for comparison to determine similarity. Further, any other requirements or attributes of the test or other task may be compared in substantially the same manners described above to determine similarity for scheduling. Similarity of resource requirements may be determined based on any suitable criteria (e.g., same, compatible, within certain ranges (e.g., absolute range, difference, percentage difference, etc.)).

The tests or other tasks may be ordered in any fashion based on the comparisons of resource or other requirements or attributes. The dynamic scheduling may be performed in response to any suitable conditions (e.g., new test/task request, addition or removal of hardware/software resources, hardware being taken on or off line, periodic intervals, random intervals, at specific times, etc.). Groups may be formed in any manner, and include any quantity of tests or other tasks determined to be similar based on any suitable criteria. The tests or other tasks within the groups may be ordered in any desired fashion (e.g., time of processing, score value or degree of similarity, random order, etc.). The groups of similar tests or other tasks may be ordered in any fashion (e.g., score value or degree of similarity, random order, etc.). The tests or other tasks may be stored in the queues or other storage structures in any desired fashion. The order of the tests or other tasks may be based on their position within the queues. Alternatively, the manager and schedule servers may provide a listing indicating the order of a test or other task. In this case, the tests or other tasks may be in the queues in any order and include an order indicator identifying when to perform the test or other task relative to the others in the queue.

The schedule server may be of any quantity, and each may schedule tests or other tasks from one or more manager servers. The manager servers serviced by a schedule server may be specified to enable the schedule server to schedule tests or other tasks for specific target machines or manager servers. The schedule server may directly receive test or other task requests from the end-user, application or other systems. Further, the schedule server may assign ordered tests or other tasks to the manager servers based on any desired criteria (e.g., manager server characteristics or attributes, resource requirements, the manager servers may be specified by users and/or tests or other tasks, etc.).

The manager servers to receive test or other task requests from the end-user, application or other systems may be determined based on any desired criteria (e.g., manager server characteristics or attributes, resource requirements, the manager servers may be specified by users and/or tests or other tasks, etc.). The manager servers may include one or more queues, where each queue may be associated with and store tests or other tasks for a specific corresponding target machine. Accordingly, present invention embodiments may apply the above techniques to only the tests or other tasks for a target machine or that reside within the corresponding queue (e.g., to schedule or reorder the tests or other tasks for only a specific target machine). Further, present invention embodiments may apply the above techniques to the tests or other tasks across one or more target machines or that reside within the corresponding queues (e.g., schedule or reorder tests or other tasks across all or any portion of the target machines). In this case, all of the tests or other tasks (for the one or more target machines or within the corresponding queues) are retrieved and collectively evaluated to determine similar tests or other tasks (independent of the queue or target machine). In addition, present invention embodiments may apply the above techniques to the tests or other tasks across one or more manager servers (e.g., for one or more target machines or within corresponding queues) in any fashion.

The manager servers may initiate or control performance of tests or other tasks on the target machines in any suitable manner (e.g., transference of information or instructions to perform the tests or other tasks, control or other packets, etc.). In addition, the target machines to perform the tests or other tasks may be determined by the manager servers based on any desired criteria (e.g., target machine characteristics or attributes, resource requirements, the target machines may be specified by users and/or tests or other tasks, etc.).

The present invention embodiments are not limited to the specific tasks or algorithms described above, but may be utilized for scheduling of any desired tasks based on a comparison of resource requirements and/or any suitable attributes. For example, present invention embodiments may be employed for smart scheduling of build requests. In addition, the present invention embodiments may be used for scheduling heterogeneous and homogeneous tasks (e.g., the same or different types of tasks). By way of example, present invention embodiments may compare resource requirements of tests and builds to schedule performance of these tasks (e.g., builds may be performed between tests, tests may be performed between builds, etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", and/or "including" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of fowls, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for dynamically scheduling performance of tasks, wherein said tasks include one or more from a group including a test and a build, said system comprising:
   a computer system including at least one processor configured to:
      determine resources required by each task for performance of that task on a target system;
      compare each task to a plurality of other tasks and determine a set of score values for each of the tasks, wherein each score value for a task represents a similarity between that task and another task, and wherein determining a score value for a task includes:
         determining a plurality of common ones of determined resources between that task and another task, wherein the plurality of common ones of determined resources include measurable characteristics;
         comparing the measurable characteristics of the plurality of common ones of determined resources; and
         combining comparison differences of the measurable characteristics to produce the score value for that task representing the similarity with the other task;
      compare the score values of each of the tasks to a threshold and determine the score values satisfying the comparison to identify the tasks associated with the identified score values as having similar resource requirements;
      determine an order of performance for each of said tasks, wherein the identified tasks with similar resource requirements based on the score values are placed adjacent each other within said order to be performed successively; and
      schedule said tasks to be performed on said target system in accordance with said order.

2. The system of claim 1, wherein said tasks with similar resource requirements include tasks with matching resource requirements.

3. The system of claim 1, wherein said tasks with similar resource requirements include tasks with resource requirements that are at least one of compatible and include a numeric characteristic within a certain range of each other.

4. The system of claim 1, wherein at least one task is associated with conditions pertaining to performance of that task, and said at least one processor is further configured to:
   adjust an order of said scheduled tasks to comply with said performance conditions of said at least one task.

5. The system of claim 1, further including:
   a plurality of computer systems each handling tasks for performance on one or more target systems;
   wherein said at least one processor is further configured to:
      determine resources required by each task handled by said plurality of computer systems;
      compare said determined resources of said tasks handled by said plurality of computer systems and identify tasks handled by said plurality of computer systems with similar resource requirements based on common ones of determined resources between the tasks; and
      schedule said identified tasks with similar resource requirements and handled by said plurality of computer systems to be successively performed on said one or more target systems.

6. The system of claim 1, wherein said at least one processor is further configured to:
   dynamically re-order and schedule said tasks for performance on said target system in response to a change to resources.

7. A computer program product for dynamically scheduling performance of tasks, wherein said tasks include one or more from a group including a test and a build, said computer program product comprising:
   a non-transitory computer readable storage medium having computer readable program code embodied therewith, the computer readable program code comprising computer readable program code configured to:
      determine resources required by each task for performance of that task on a target system;
      compare each task to a plurality of other tasks and determine a set of score values for each of the tasks, wherein each score value for a task represents a similarity between that task and another task, and wherein determining a score value for a task includes:
         determining a plurality of common ones of determined resources between that task and another task, wherein the plurality of common ones of determined resources include measurable characteristics;

comparing the measurable characteristics of the plurality of common ones of determined resources; and combining comparison differences of the measurable characteristics to produce the score value for that task representing the similarity with the other task;

compare the score values of each of the tasks to a threshold and determine the score values satisfying the comparison to identify the tasks associated with the identified score values as having similar resource requirements;

determine an order of performance for each of said tasks, wherein the identified tasks with similar resource requirements based on the score values are placed adjacent each other within said order to be performed successively; and schedule said tasks to be performed on said target system in accordance with said order.

8. The computer program product of claim 7, wherein said tasks with similar resource requirements include tasks with matching resource requirements.

9. The computer program product of claim 7, wherein said tasks with similar resource requirements include tasks with resource requirements that are at least one of compatible and include a numeric characteristic within a certain range of each other.

10. The computer program product of claim 7, wherein at least one task is associated with conditions pertaining to performance of that task, and said computer readable program code further includes computer readable program code configured to:

adjust an order of said scheduled tasks to comply with said performance conditions of said at least one task.

11. The computer program product of claim 7, wherein said tasks are handled by a plurality of computer systems for performance on one or more target systems, and wherein said computer readable program code further includes computer readable program code configured to:

determine resources required by each task handled by said plurality of computer systems;

compare said determined resources of said tasks handled by said plurality of computer systems and identify tasks handled by said plurality of computer systems with similar resource requirements based on common ones of determined resources between the tasks; and schedule said identified tasks with similar resource requirements and handled by said plurality of computer systems to be successively performed on said one or more target systems.

12. The computer program product of claim 7, wherein said computer readable program code further includes computer readable program code configured to:

dynamically re-order and schedule said tasks for performance on said target system in response to a change to resources.

\* \* \* \* \*